Figure 1:
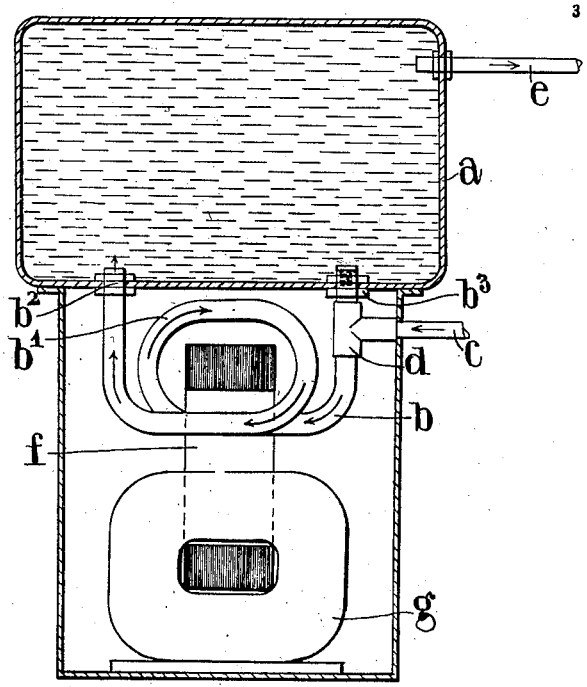

C. H. LAUTH.
ELECTRICALLY HEATED LIQUID HEATER.
APPLICATION FILED JUNE 16, 1920.

1,415,457.

Patented May 9, 1922.
3 SHEETS—SHEET 1.

Inventor
C. H. Lauth
By H. R. Kerslake
Atty

C. H. LAUTH.
ELECTRICALLY HEATED LIQUID HEATER.
APPLICATION FILED JUNE 16, 1920.
1,415,457.
Patented May 9, 1922.
3 SHEETS—SHEET 2.
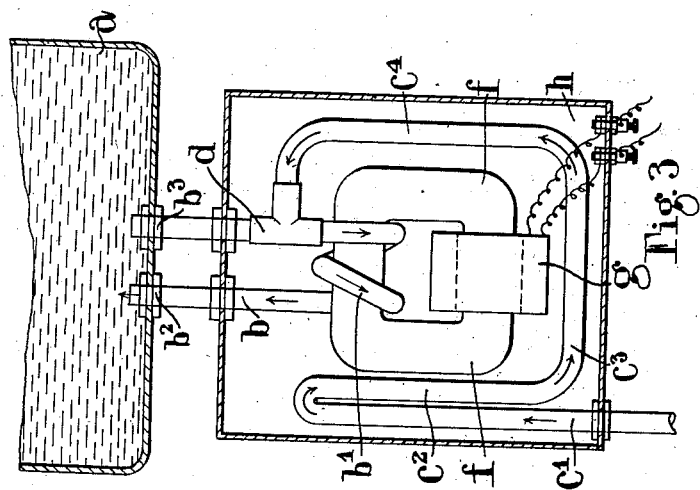
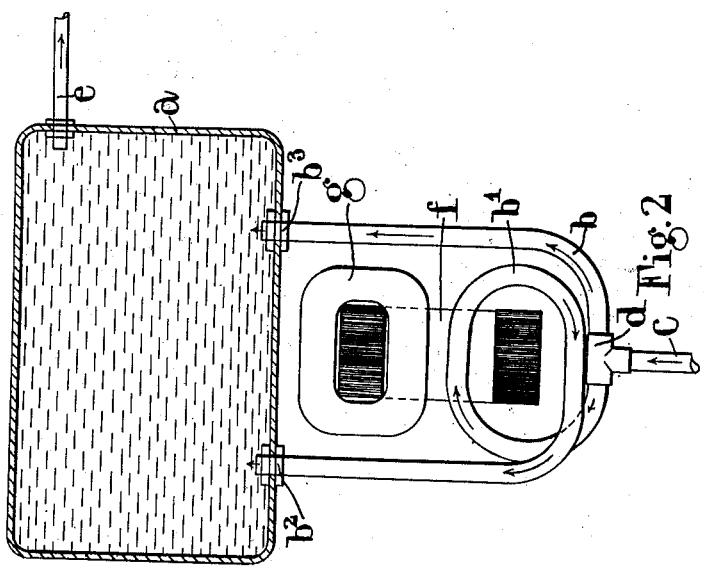
Inventor
C. H. Lauth
By K. R. Kerslake
Atty.

C. H. LAUTH.
ELECTRICALLY HEATED LIQUID HEATER.
APPLICATION FILED JUNE 16, 1920.
1,415,457.
Patented May 9, 1922.
3 SHEETS—SHEET 3.
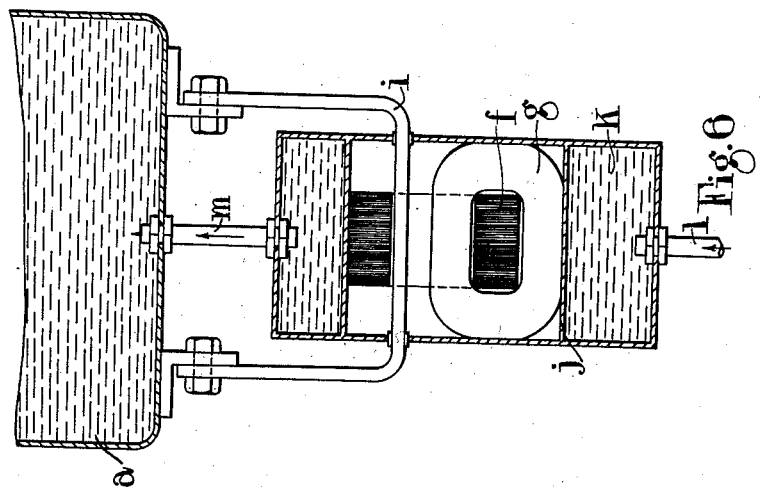
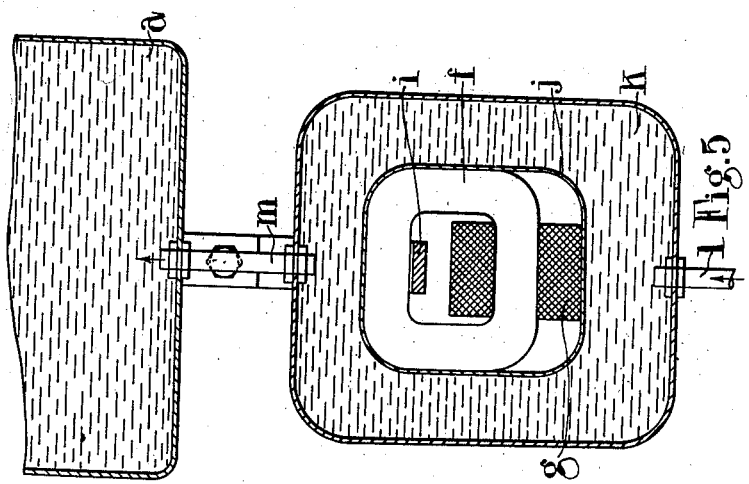
Inventor
C. H. Lauth
By H. R. Kerslake
Atty.

UNITED STATES PATENT OFFICE.

CLARENCE HAROLD LAUTH, OF LONDON, ENGLAND.

ELECTRICALLY-HEATED LIQUID HEATER.

1,415,457.  Specification of Letters Patent.  Patented May 9, 1922.

Application filed June 16, 1920. Serial No. 389,471.

*To all whom it may concern:*

Be it known that I, CLARENCE HAROLD LAUTH, A.M.I.E.E., B.Sc., a subject of the King of Great Britain and Ireland, residing at 11 Highbury Mansions, Upper Street, Islington, London, N. 1, in the county of London, England, have invented certain new and useful Improvements in Connection with Electrically-Heated Liquid Heaters, of which the following is a specification.

This invention relates to liquid heaters of the kind in which the heating of liquid contents of a vessel is effected by means of an electric current of high amperage and low voltage induced in the secondary circuit of a transformer, separate from but attached to said vessel, and in which the shell of the vessel is utilized as the heating resistance inserted in the secondary circuit of the transformer, or in which the heating is effected by means of a heating element immersed in the water or other liquid to be heated, and inserted in the said secondary circuit.

It is known in connection with heaters consisting of iron pipes through which the liquid is caused to flow and in which the heat is produced by hysteresis and eddy currents induced in the said pipes by an exciting coil connected to the secondary of a transformer, to surround the exciting coil by a jacket through which the liquid is caused to pass prior to its entering the said iron pipes. It has also been proposed in electric stoves to place the transformer supplying the electric energy thereto in a water tank, in order to utilize the heat losses in the transformer. It is also known to heat a liquid by passing it through a coiled metallic pipe constituting the secondary circuit of a transformer. Further, the use of an oil bath as a heat conducting medium between an electrical heating element and a liquid to be heated is also known.

According to the present invention the water or other liquid before being fed to the heating vessel of a liquid heater of the kind referred to, is first caused to flow or circulate through a metal path which is in direct or indirect contact with the transformer, for the purpose of keeping the latter cool, and of utilizing the otherwise waste heat generated in the transformer.

The invention also consists in the improved liquid heaters hereinafter more particularly described.

Figures 1–6 of the accompanying drawings illustrate diagrammatically and by way of example, various modes of carrying the invention into effect.

Referring to the mode of construction illustrated in Figure 1, $a$ is a boiler or other vessel, to which the cold water or other liquid is admitted through a pipe $b$ of copper or other metal which is in good mechanical and electrical connection with the vessel $a$, the feed water or the like being admitted to the pipe $b$ through a pipe $c$ connected thereto by the "T" connection $d$, and after having flowed through the coiled portion $b^1$, admitted into the vessel $a$ at the junction end $b^2$, and the other junction $b^3$ of the pipe $b$ being plugged up. $e$ is the outlet from the vessel $a$.

The pipe $b$ constitutes the secondary coil of the transformer, $f$ being the magnetic core and $g$ the primary coil thereof, and the secondary circuit being completed through the shell of the vessel.

Another form of construction, in which the secondary coil of the transformer is also utilized for leading the feed water to the vessel is shown in Figure 2, which differs from the arrangement illustrated in Figure 1, in that the pipe $b$ which is preferably arranged to surround the lower part of the magnetic core, is open at both junctions $b^2$ and $b^3$, the water entering the vessel $a$ at both ends of the pipe.

According to another form of construction, as illustrated in Figure 3, the transformer core $f$, primary coils $g$ and part of the secondary circuit constituted by the pipe $b$ are enclosed in an oil bath $h$, the feed water being first caused to pass through a worm or series of pipes $c^1$, $c^2$, $c^3$, $c^4$ before being admitted to the pipe $b$ of the secondary circuit, whence it passes to the vessel $a$ through the open junction $b^2$, the junction $b^3$ being plugged up.

The part of the tubular secondary which lies within the case of the transformer in contact with the oil bath, or in proximity to the magnetic core, is preferably made of stout section of copper or other material of high conductivity, so that the heat generated therein shall be small.

Figure 4:
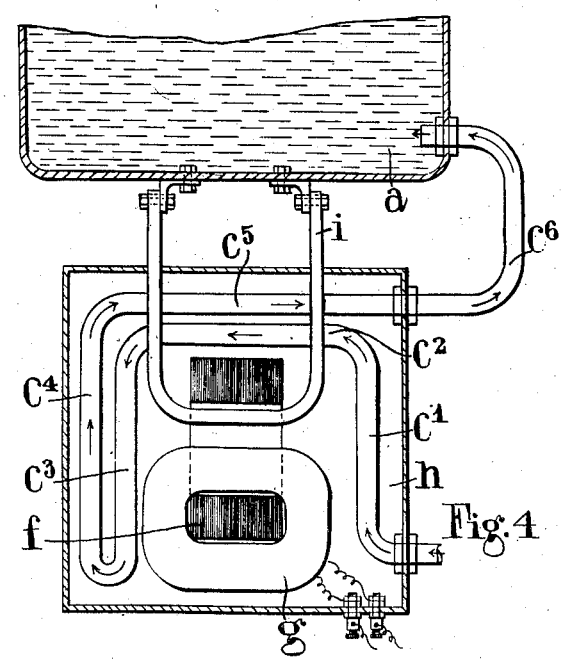

The form of construction illustrated in Figure 4 differs from that shown in Figure 3 in that the worm or series of pipes $c^1$, $c^2$, $c^3$, $c^4$, $c^5$ immersed in the oilbath $h$ leads the feed water to the vessel $a$ direct, through a pipe $c^6$, instead of through a pipe forming part of the secondary circuit of the transformer, the latter circuit being partly constituted by a metallic connection $i$, to which the vessel $a$ is detachably connected, as in my concurrent application No. and completed by the said vessel.

In the forms of construction illustrated in Figures 3 and 4, the cooling of the transformer is effected by a transference of heat therefrom to the oil and whence to the worm or series of pipes and thus into the feed water.

Figures 5 and 6 illustrate a sectional elevation and transverse section of a further arrangement, in which the transformer case $j$ enclosing the transformer core $f$, the primary coils $g$ and part of the secondary circuit $i$ are enclosed in and cooled by a jacket $k$, through which the feed water is caused to pass prior to its admission to the boiler $a$, $l$ and $m$ showing the inlet and outlet pipe to and from the said jacket respectively. The secondary circuit which is of a similar construction as that described with reference to Figure 4, is arranged to pass through the casing $j$ of the transformer, as shown.

I wish it to be understood that the details for carrying the invention into effect may be modified in various respects without in any way departing from the spirit of the invention. For instance, the tubular secondary shown in some of the forms of construction as attached to the bottom of the boiler, may otherwise be attached thereto, although the form of construction shown is preferred since, in the event of no fresh cold feed water being supplied thereto, the water in the tubular secondary will then be the coldest in the system. Further, in the arrangement shown in Figures 5 and 6, the secondary $i$ may be replaced by a tubular secondary such as shown in Figures 1–3, the feed water being admitted thereto from the water jacket $k$ by a suitable pipe connection. Moreover, the whole of the transformer may be immersed in an oil bath before being enclosed in the water jacket, and the transformer and boiler be arranged at any desired distance from each other.

What I claim is:

1. The combination with a liquid heater and a transformer for heating the said heater by a current of high amperage and low voltage derived from the secondary of the transformer of a path for the flow of liquid to the heater, which path is so arranged that the liquid will absorb heat from the transformer prior to its reaching the heater, as and for the purposes set forth.

2. In combination with a liquid heater, a transformer having a secondary for heating the said heater by a current of low voltage and high amperage, said secondary being constituted by a pipe in open communication with the heater, and an inlet to the said pipe for the admission of liquid thereto prior to the admission thereof into the heater, as set forth.

3. The combination claimed in claim 2, with the pipe which carries the secondary current being in good electric contact with the heater at both its ends and communicating with the interior of the heater at one end, as set forth.

4. The combination with a liquid heater and a transformer for heating the said heater by a current of high amperage and low voltage derived from the secondary of the transformer, of a series of pipes for the flow of liquid to the heater, an inlet to said series of pipes for the admission of liquid thereto prior to the admission thereof into the heater, and an oil bath in which the transformer is enclosed, and in which the said series of pipes is immersed, as set forth.

5. The combination claimed in claim 4, having the secondary of the transformer constituted by a pipe which is in communication with the series of pipes immersed in the oil bath, as set forth.

In testimony whereof I have signed my name to this specification.

CLARENCE HAROLD LAUTH.